United States Patent [19]

Janus et al.

[11] Patent Number: 5,689,604
[45] Date of Patent: Nov. 18, 1997

[54] FIBER OPTIC OPERATIONS CENTER

[75] Inventors: Neal Anthony Janus, Parsippany; Frank Salvatore Leone, Berkeley Heights; William Joseph Parzygnat, Morris Township; Richard Joseph Pimpinella, Hampton; Randy Alan Reagan, Morris Plains, all of N.J.

[73] Assignee: Lucent Technologies Inc., Murray Hill, N.J.

[21] Appl. No.: 709,978

[22] Filed: Sep. 9, 1996

[51] Int. Cl.6 .................................................. G02B 6/36
[52] U.S. Cl. ........................................ 385/134; 385/135
[58] Field of Search .............................. 359/109, 110, 359/142, 147; 385/134, 135

[56] References Cited

U.S. PATENT DOCUMENTS

| | | | |
|---|---|---|---|
| 5,204,925 | 4/1993 | Bonanni et al. | 385/89 |
| 5,339,379 | 8/1994 | Kutsch et al. | 385/135 |
| 5,402,515 | 3/1995 | Vidacovich et al. | 385/135 |
| 5,448,675 | 9/1995 | Leone et al. | 385/135 |
| 5,461,693 | 10/1995 | Pimpinella | 385/135 |
| 5,511,144 | 4/1996 | Hawkins et al. | 385/135 |
| 5,513,293 | 4/1996 | Holland et al. | 385/135 |
| 5,530,954 | 6/1996 | Larson et al. | 385/135 |

*Primary Examiner*—John Ngo

[57] ABSTRACT

Disclosed is a fiber optic operations center intended for use in a central office which is responsible for the administration, monitoring, testing, and repair of a multiplicity of fiber optic cables entering the central office from subscribers. The operations center is housed in a bay which is arranged to protect fiber optic cables and route then to an optical switch which connects one or more selected cables to a test device which launches and receives optical signals. The test device is under the control of a system controller which has a variety of input and output means which enable craftpersons in the central office and in remote locations to access the operations center.

20 Claims, 8 Drawing Sheets

FIBER OPTIC OPERATIONS CENTER

BACKGROUND OF THE INVENTION

1. Cross Reference to Related Applications

This application is related to another U.S. patent application, having a filing date of May 13, 1996, Ser. No. 08/645,108 entitled "An Optical Communications System Having Distributed Intelligence", (Jennings 5-1-2-17) having a common assignee, at least one common inventor, and being incorporated herein by reference.

2. Field of the Invention

This invention relates to a fiber optic operations center, and more particularly to one which functions in a central office having a multiplicity of incoming fiber optic cables. The operations center provides a centralized point of access for fiber optic cable administration, optical testing, surveillance, and maintenance.

3. Description of Related Art

The progression of information services such as video conferencing, data transmission, and on-line applications require ever increasing bandwidth in transmission. One transmission medium which is being installed nationwide is the fiber optic cable, where a glass fiber provides wide bandwidth communications to a business (a private branch exchange) or to a node which serves a group of subscribers, such as homes. These nodes may be located in a series of manholes at a distance from a central office into which as many as 40,000 fiber optic cables are connected. This complexity aggravates the interruption of service, hence loss of revenue and customer dissatisfaction, when one of these wide band communications channels is interrupted. An interruption is particularly acute for services which provide air traffic control, emergency services, real time financial transactions, and many more. The return of service is often delayed because notice of the interruption is initiated by a customer complaint and the location of the fiber optic cable fault is often performed manually between craftpersons in the central office and in field locations such as manholes. Furthermore, the trouble condition could be caused by a fiber problem or one in the electronics associated with the disrupted communications channel.

It is desirable, therefore, to have an operations center within a central office which monitors the condition of the fiber optic cables emanating therefrom with continuous sampling of these cables and one which has alarm functions and is addressable by craftpersons in the central office and in field locations. Further, this surveillance and maintenance system should be self contained in a bay of equipment without the need to wheel service carts to the fiber optic terminations.

SUMMARY OF THE INVENTION

The present invention relates to a fiber optic operations center which is mounted in a bay and provides a centralized point of access for cable administration for a multiplicity of cables entering a central office.

In one embodiment of the invention, an optical switch receives fiber optic cables, selects one or more of these cables and connects them to a test unit which is adapted to generate, transmit, receive, and analyze optical signals. The test unit operates under the direction of a system controller which has access to stored algorithms, input means, and output means. The input means may include a keyboard, a mouse, or a line to a remote site, such as a manhole where a craftperson is working. The output may include an alphanumeric display, an audible alarm, a monitor, a beeper signal, a printer, or a line to a remote site. A local area network, incorporating sensors distributed throughout the fiber optic cable network, monitors traffic on the cable network and alerts the system controller when signal levels or operating conditions violate a threshold value.

In another embodiment of the invention, a frame supports an upper raceway containing a radius which protects entering fiber optic cables from too sharp a bend radius. The frame also supports duct walls which further restrain the fiber optic cables within the operations center. Other components such as an optical switch, a system controller, a fuse panel, a lower raceway, input and output means, a writing shelf, and electrical power and signal outlets are mounted to the operations center. Some of the foregoing are mounted to pull-out shelves for easy access.

These and other features and advantages of the invention will be better understood with consideration of the following detailed description of the preferred embodiments taken in conjunction with the accompanying drawings.

BRIEF DESCRIPTION OF THE DRAWINGS

FIG. 2 to 6 show additional elements of the invention;

Figure 1:
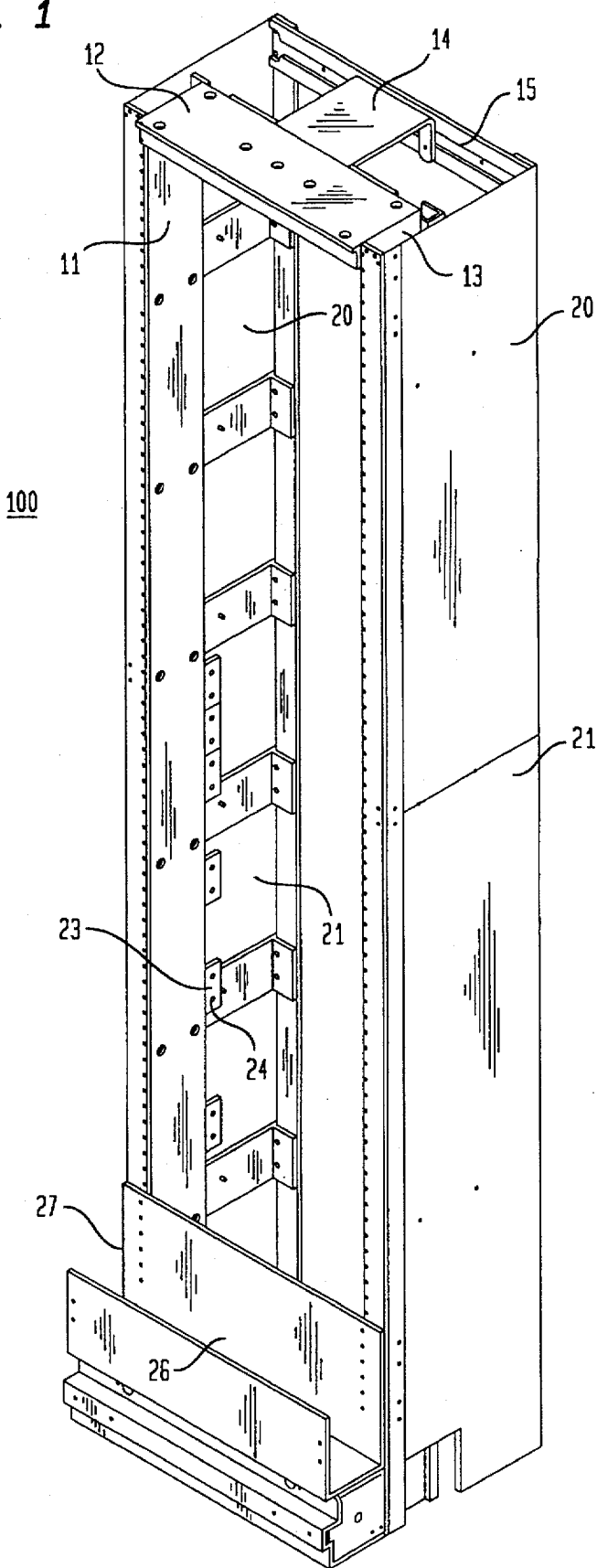
FIG. 1 is a perspective drawing of some elements of the invention.
Figure 1:
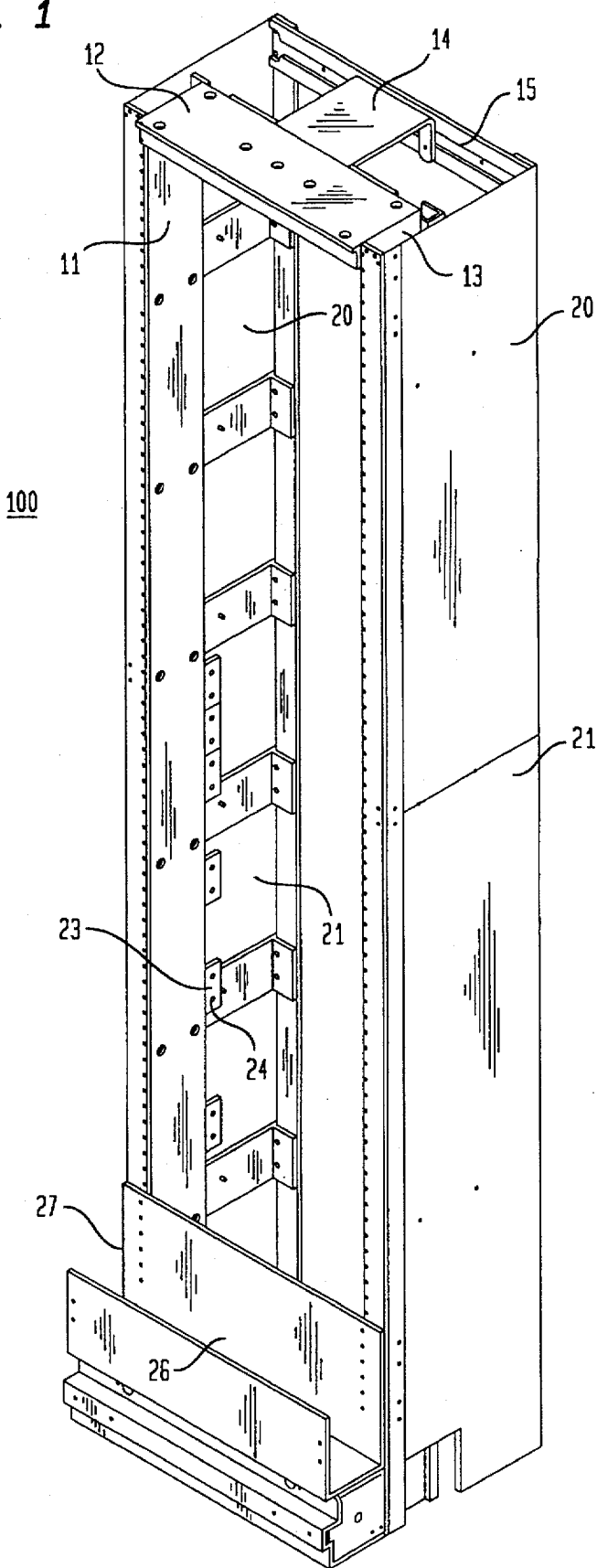

The drawings are not to scale.

DETAILED DESCRIPTION OF THE PREFERRED EMBODIMENTS

In the following description, similar elements are referred to by the same reference numeral in order to simplify the sequential aspect of the drawings.

Referring now to FIG. 1, there is shown bay 100 comprising left frame 11 and right frame 13 which support upper bracket 12 which extends across the interior of the bay. Each frame defines a series of mounting holes approximately one inch on center. Top support bracket 14 is attached to upper bracket 12, extending to the rear of the bay to meet rear bracket 15. Upper duct walls 20 and lower duct walls 21 are supported by frames 11 and 13 on the left and right sides of the bay, respectively. Rear bracket 15 is also attached to the upper duct walls to strengthen them. The frames also support a multiplicity of rear support bracket assemblies 23 each having a shoulder stud 24 which is adapted to hold a shelf (not yet shown) in place while it is attached to the bay. This feature aids craftpersons in the quick assembly and removal of shelves in the bay. Lower raceway 26 is adapted to restrain fiber optic cables and it is supported by left frame 11 and right frame 13. The attachment is made by fastening means 27, many forms of which are well known in the art, such as screws, rivets, push-on clips, and the like. Similar means are used throughout the assembly of the operations center.

Referring now to FIG. 2, there is shown rear bottom frame 30, secured by fastening means 31, to lower duct walls 21. Service bracket 32 is fastened to left frame 11 and right frame 13 (not shown). The service bracket supports AC outlet assembly 35 which is adapted to supply power to the bay, and connector enclosure assembly 37 which is adapted to provide access to the bay for input and output electrical signals from other bays in the central office or from remote sites, such as manholes or customer's premises.

Figure 3:
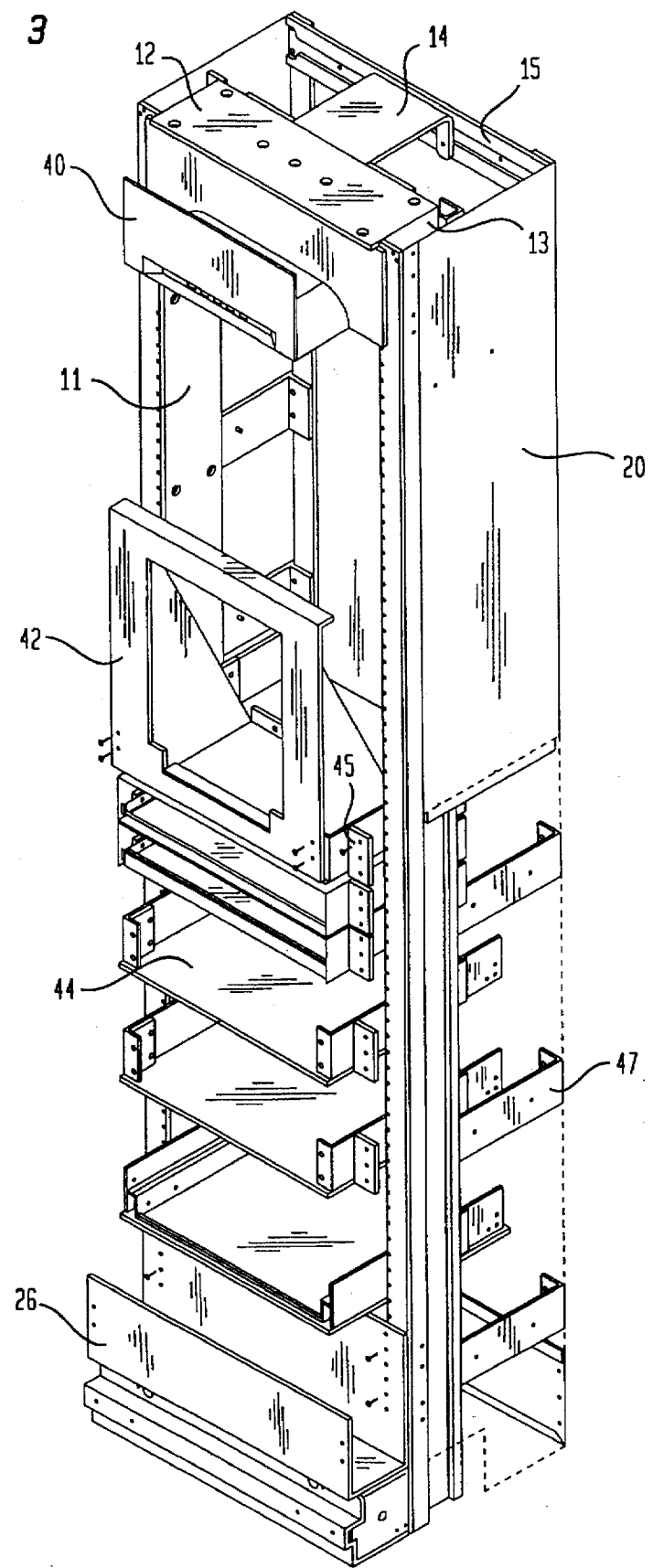

Referring now to FIG. 3, there is shown, attached to the frames, upper raceway 40 having a radius 41. The raceway is adapted to restrain fiber optic cables and radius 41 ensures that they are protected from excessive bending stress and loss of their optical conductivity by providing a lower limiting radius about which they can be bent as they hang down from the raceway. A series of support shelves 44, each having a mounting bracket 45 attached thereto, are shown in a partially extended position in the bay. Roll-out shelves for electronic equipment are well known and commercially available. Monitor housing 42 is shown fastened to one of these shelves. A multiplicity of stiffeners 47, which provide rigidity to the bay, are shown attached to frame 13.

Figure 4:
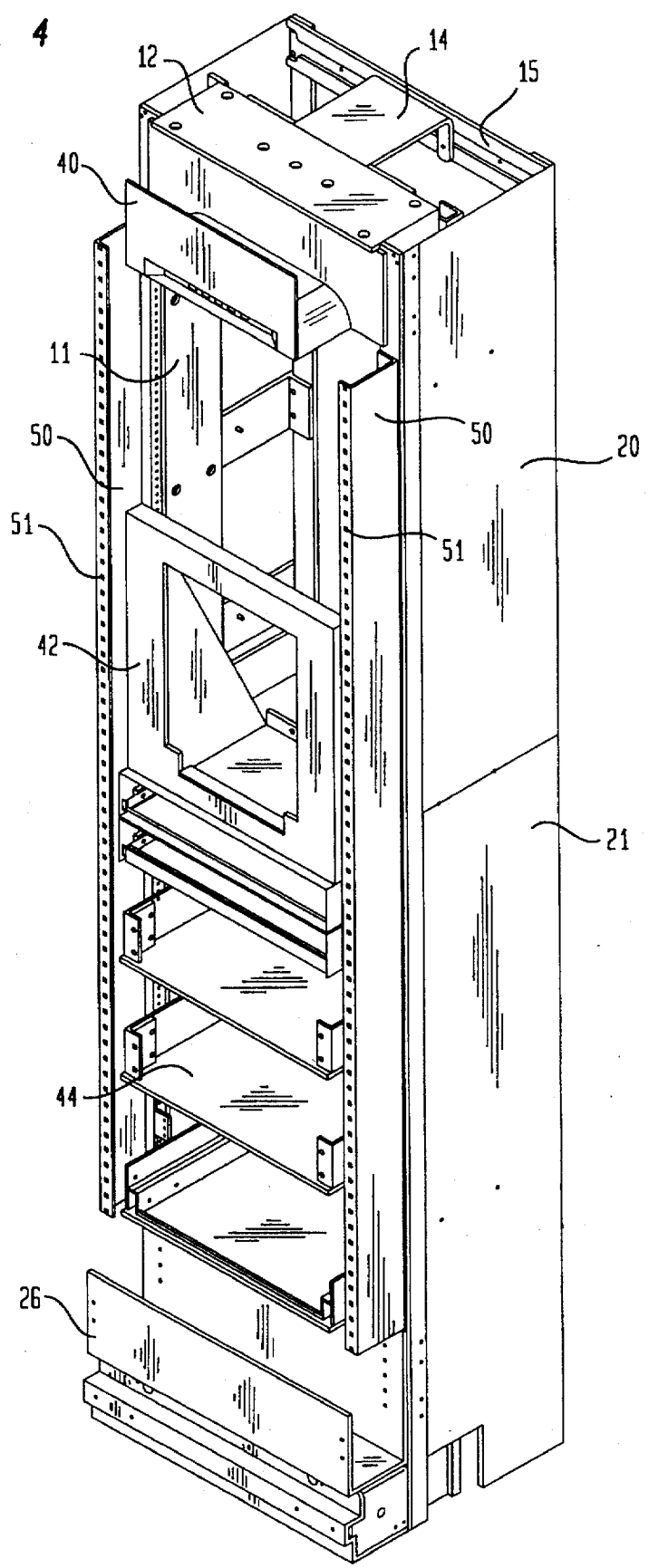

Referring now to FIG. 4, additional elements of the bay in addition to those previously described, are facial rails 50 on the left and right sides of the bay, each being attached to frames 11 and 13, respectively. Each facial rail defines a series of holes 51. In a preferred embodiment, the facial rails are U-shaped sections and at least one side of the U defines a series of square holes which are spaced approximately one inch on centers.

Figure 5:
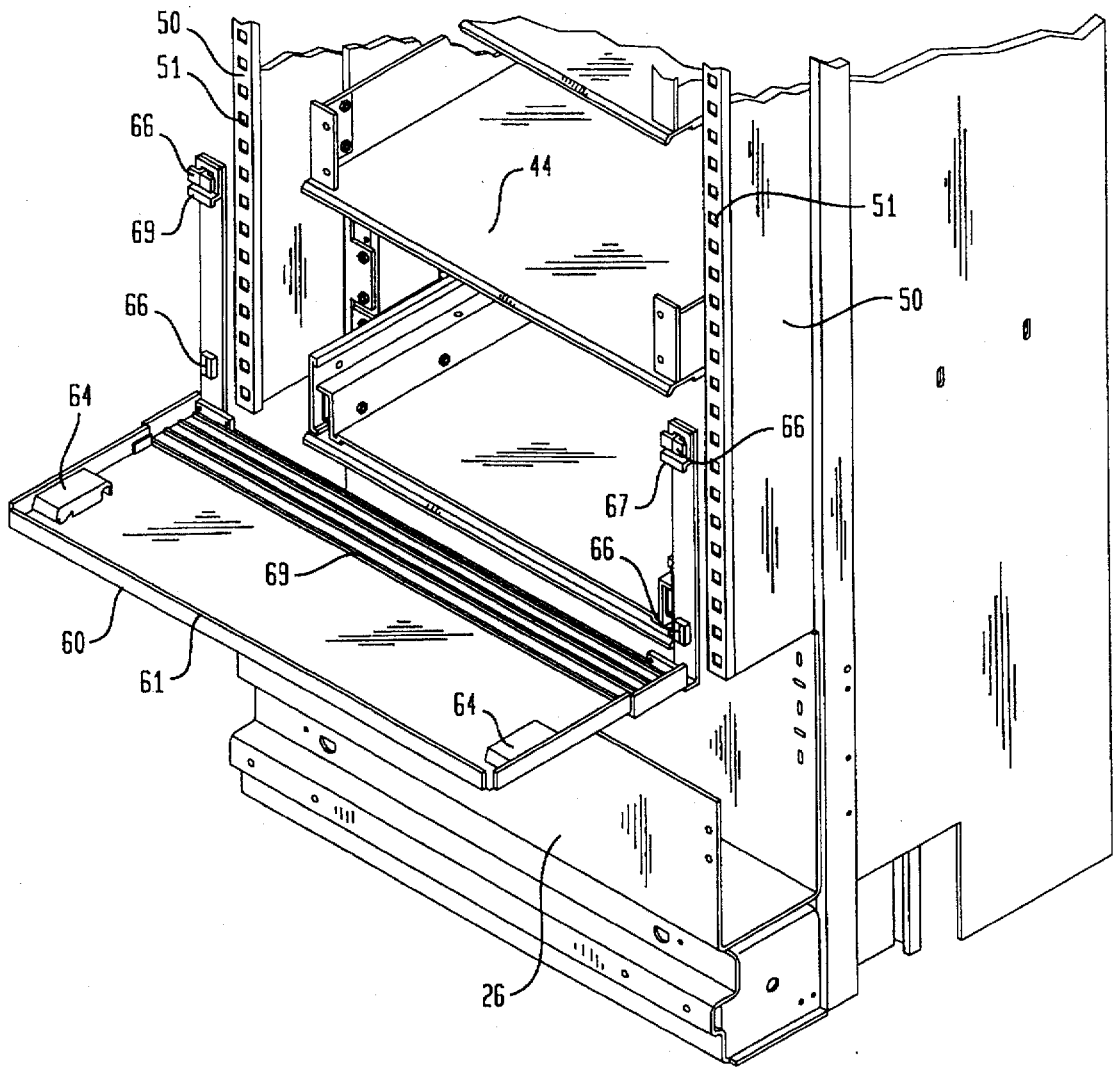

Referring now to FIG. 5, there is shown an additional element to those previously described, facial panel 60, which has an inner surface 61 upon which are mounted latches 64 on the left and right sides of the inner surface. The facial panel is pivotally attached to side brackets 62 on the left and right sides of the facial panel. Each side bracket supports at least one fastener 66 which is adapted to penetrate any of holes 51 to secure the side bracket to facial rail 50. The art of fasteners is well known, but in a preferred embodiment, latches 64 are provided by Southco® of Concordville, Pa., and they cooperate with retainer clips 67 to hold the facial panel against the facial rail. The retainer clips are held against the side brackets by fastener 66 which is supplied by Hartwell Corp. of Placentia, Calif. under the tradename, Nylatch®. An advantage of the Nylatch fastener is that it is secured against the facial rail by a quarter-turn rotation. The spacing of holes 51, say at approximately one inch on centers, has the advantage of flexibility in mounting various sized components on shelves 44. Facial panels 60 cover these components and are typically five, seven, or nine inches high, having louvers 69 to provide air flow to heat-generating components.

Figure 6:
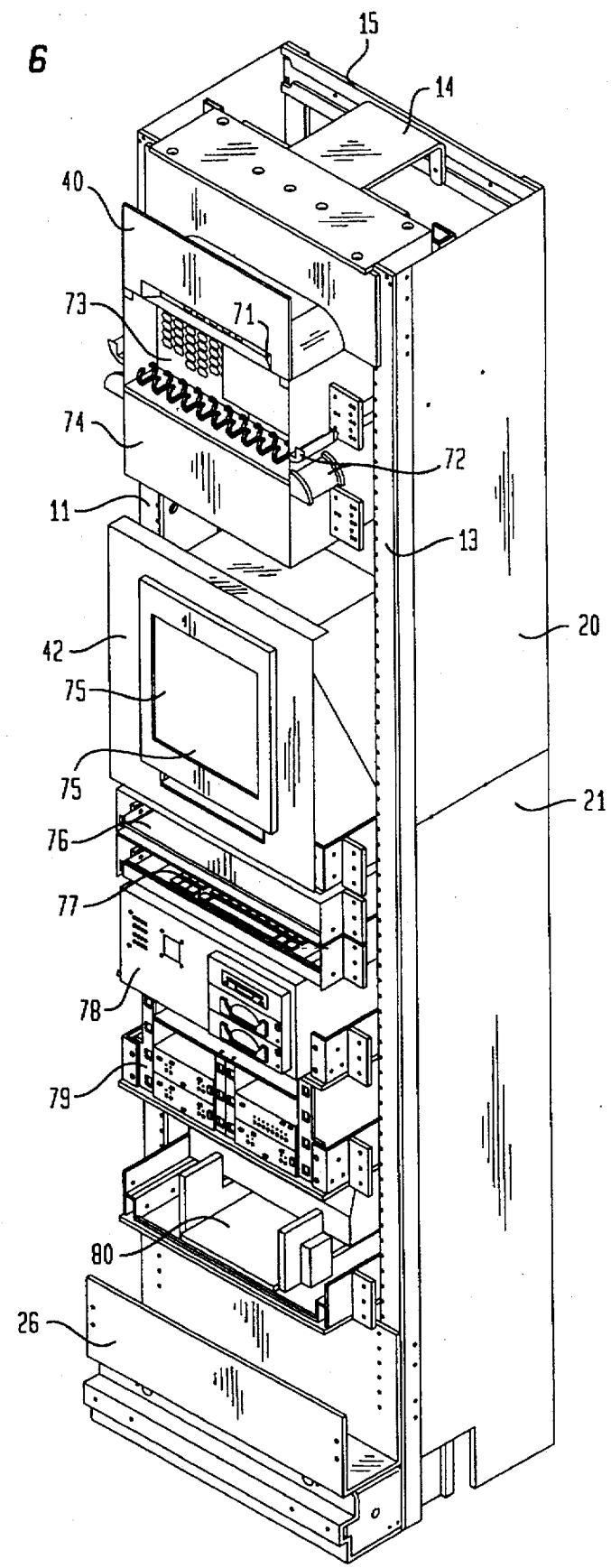

Referring now to FIG. 6, there are shown additional elements of the preferred invention, a smart LGX® operations center, comprising optical switch 73, remote test unit 74, monitor 75, writing shelf 76, keyboard 77, system controller 78, node shelf 79, and printer shelf 80 in addition to the elements previously described. Fuse panel 61 is located high in the bay for easy visibility and located in front for easy access for replacement. It is supported by upper housing 40, which is located on top of the bay to accept incoming/outgoing fiber optic cables. The optical switch is located below the upper raceway and serves to switch all the functions of the operations center into any of the fiber optic cables connected to the bay. Remote test unit 74 supplies a signal of at least one wavelength to a selected fiber optic cable and is adapted to receive reflections from that signal from any physical discontinuities or breaks in the cable. It can determine the amplitude of the reflected signals and the distance of any discontinuity from the test unit. In a preferred embodiment, the remote test unit is an optical time domain reflectometer, the operation of which is well known in the art. A pair of cable radius 62 is shown between the optical switch and the remote test unit. Each provides the same function as the radius in the upper raceway, namely, to prevent damage and unnecessary optical signal loss to the cables. Additional cable radius 62 may be positioned as needed throughout the bay. In the shown embodiment, monitor 75 is at approximately eye level to a craftperson, and it is one output means provided by the operations center to alert the craftperson about conditions in the cable network. Other output means may include a rack mounted alphanumeric display, an audible alarm, a printer, a beeper, and a line linking the system controller to a remote site such as a manhole via connector enclosure assembly 37 described in FIG. 2. Writing shelf 76 is conveniently placed below the monitor to support notepads and network operations manuals. Keyboard 77 is an input means to direct system controller 78 located below it. Other input means may be a mouse or a line connected to a hand held unit operated by a craftperson in a remote manhole. This line is connected to the system controller via connector enclosure assembly 37. The system controller is a computer that operates with algorithms specifically developed for the surveillance, testing, monitoring, or alarm signaling of a fiber optic network. Node shelf 79 contains additional electronic/ optical modules to interconnect the signals from the remote test unit to a selected cable. The printer shelf is provided to hold a printer which provides hard copies of data from the system controller.

Figure 7:
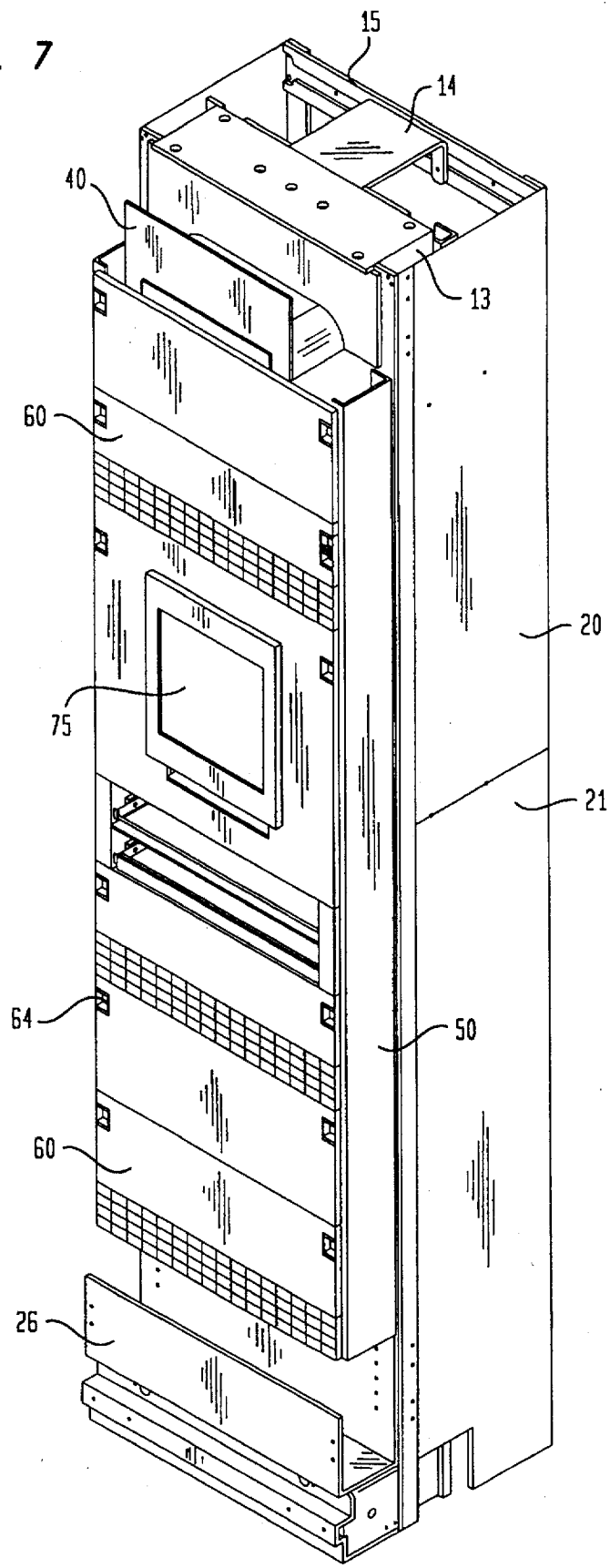
FIG. 7 shows the completed operations center.

Referring now to FIG. 7, there is shown the fiber optic operations center with facial panels 60, held in a closed position by latches 64, which are louvered in positions where they cover heat-generating equipment like a remote test unit or system controller. FIG. 7 shows one advantageous embodiment illustrating how the operations center in normal use in a central office, however, it will be understood that because of the modular nature of the center, components thereof may be arranged to produce any number of combinations.

Figure 8:
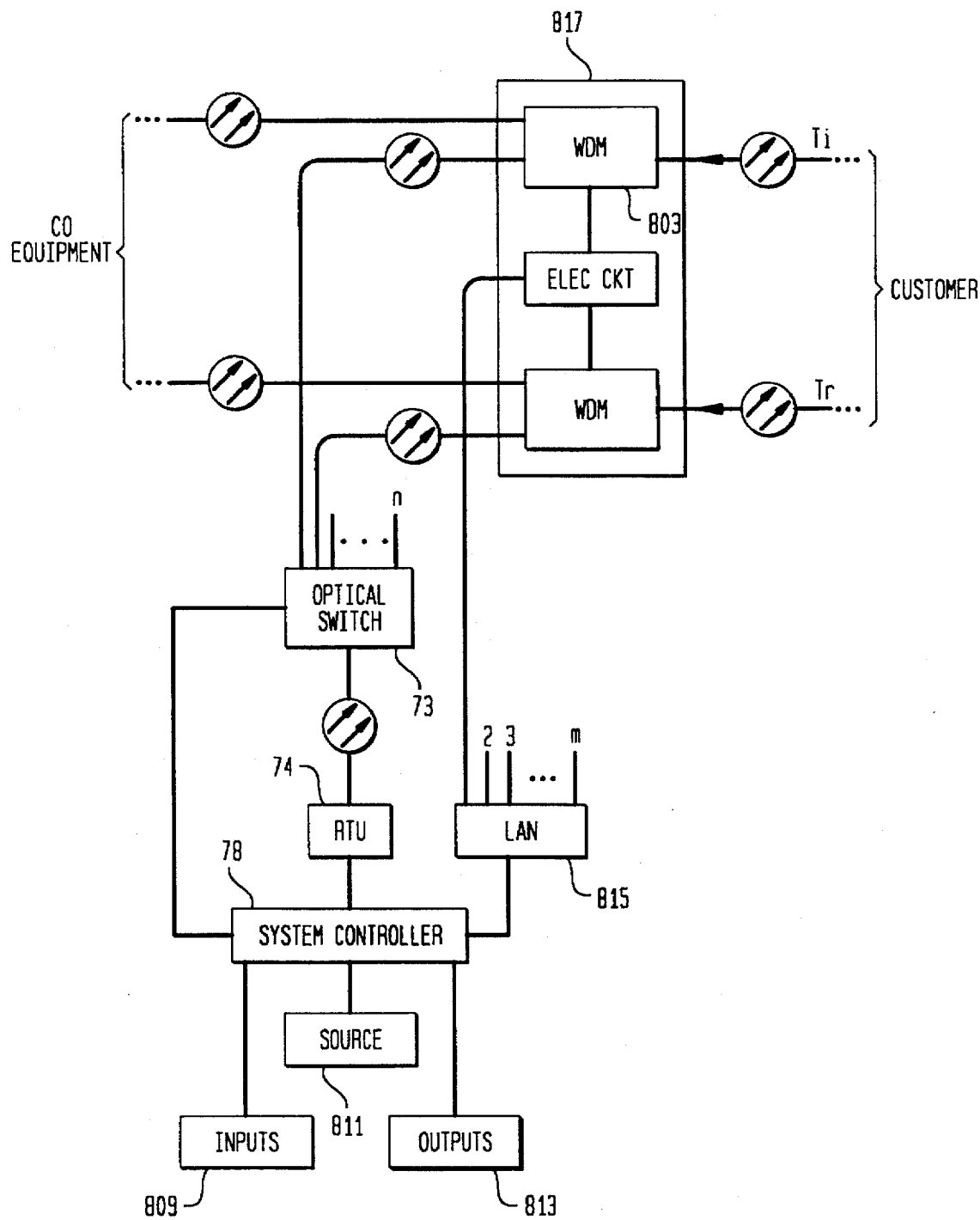
FIG. 8 is a block diagram describing the functions of the invention.

Referring now to FIG. 8, there is shown a block diagram describing the interrelationship of various elements of the operations center in performing its integrated functions. A set of transmit receive fiber optic cables connected to customers is shown entering module 817. In a preferred embodiment, a multiplicity of n fiber optic cables, each having a transmit and receive fiber, connect to a multiplicity of modules. As would be understood, the cables may be single mode or multimode, and they carry information using at least one wavelength. The optical switch 73 may have multiple stages and it selects one of the customer cables under the direction of system controller 78 receiving its optical input from the RTU. The optical switch connects transmit and receive fibers, $T_t$ and $T_r$, respectively, to the RTU 74 which contains both optical and electronic circuits to generate and sample test signals. The (WDM) multiplexers 803 mix optical test signals from the RTU 74, which is an optical time domain reflectometer in a preferred embodiment with customer service signals. The optical time domain reflectometer is adapted to send optical pulses of at least one wavelength into a fiber optic cable, monitor reflected portions of that pulse, convert that information into an electronic signal, and feed that electronic signal to the system controller. The system controller is also connected to input means 809, a source of algorithms 811, and output means 813. The input means may be: a keyboard, a mouse, or a line to a remote site, used alone or in combination. The source of algorithms is a memory which contains instructions and reference data relating to the performance of the fiber optic network. The output means may be: a visual rack mounted alphanumeric display, an audible alarm, a monitor, a printer, a signal to activate a beeper carried by a craftperson, or a line to a remote site such as a manhole, used alone or in combination. The operations center may operate under manual control for fault detection or it may operate under the direction of the algorithms to sequentially sample the n customer lines and compare their characteristics to standard values. The operations center is also connected to LAN 815, a local area network within the fiber optic cable network served by the central office. Inputs to the LAN are from a multiplicity of m modules 817, distributed throughout the network, each containing a sensor which is adapted to monitor optical performance in a fiber optic cable and to provide a sensor alarm when a preset signal or performance threshold is violated. When system controller 78 receives this information it initiates further sampling of the fiber by the remote test unit. The operations center thus provides continuous monitoring of the network via distributed sensors which detect the integrity of traffic-bearing or non-traffic-bearing fiber optic cables.

The advantages of the operations center are its compatibility with the embedded base of hardware which has already been installed in central offices since it can be placed under the upper raceway among distribution frames. By sensors contained in the modules distributed throughout the network, the operations center provides continuous monitoring of fiber optic cable integrity. It also improves the functionality of these offices by organizing fiber troughs within the bay, providing an easily visible and accessible fuse module, having removable facial panels, and providing a logical arrangement of equipment in modular units with standard sizes. Another advantage of the operations center is the incorporation of human factors design considerations by organizing test, control, and input/output means in a logical fashion in a single, self-contained bay.

Changes and modifications in the specifically described embodiments can be carried out without departing from the scope of the invention. In particular, mounting and fastening means well known in the art may be substituted for each other. Components such as the optical switch, the remote test unit, the system controller, input means and output means may be mounted directly to the frame or they may be mounted on shelves, and their relative positions can be interchanged.

We claim:

1. A fiber optic operations center comprising:
   a frame defining a series of mounting holes;
   an upper raceway, supported by the frame, having a radius adapted to protect fiber optic cables from excessive bending stress;
   a duct wall, supported by the frame, adapted to restrain fiber optic cables;
   a multiplicity of support shelves, having mounting brackets adapted to mate with mounting holes in the frame;
   an optical switch, mounted to the frame, adapted to receive a multiplicity of fiber optic cables and to select one or more of them thereby connecting them to one or more outputs;
   a remote test unit adapted to generate, transmit, receive, and analyze optical signals of at least one wavelength, having electronic inputs and outputs and optical inputs and outputs;
   a system controller, supported by a shelf, having a multiplicity of inputs and outputs, being connected to the optical switch to direct the selection of fiber optic cables, being connected to the remote test unit to direct the generation of an optical signal;
   input means, supported by a shelf, being connected to the system controller; and
   output means, supported by a shelf, being connected to the system controller.

2. The fiber optic communications system of claim 1 further comprising a fuse panel supported by the upper raceway.

3. The fiber optic communications system of claim 1 further comprising a cable radius, interspersed between the optical switch and the remote test unit, being adapted to limit the minimum bend radius of a fiber optic cable.

4. The fiber optic communications system of claim 1 further comprising a lower raceway, mounted to the frame, being adapted to restrain fiber optic cables.

5. The fiber optic communications system of claim 1 further comprising an AC outlet assembly adapted to receive power and distribute it to the system controller, the remote test unit, and the optical switch.

6. The fiber optic communications system of claim 1 further comprising a connector enclosure assembly adapted to receive input signals from a remote location and connect them to the system controller.

7. The fiber optic communications system of claim 1 further comprising a facial rail, mounted to the frame, defining a series of holes.

8. The fiber optic communications system of claim 1 further comprising a facial panel, having an inner surface supporting at least one latch, being pivotally connected to at least one side bracket, said bracket being adapted for fastening to at least one hole in the facial rail.

9. The fiber optic communications system of claim 1 further comprising at least one rear support bracket assembly, mounted to the frame, each having a shoulder stud adapted to hold a shelf in place as it is mounted into the frame.

10. The fiber optic operations center of claim 1 wherein the input means is selected from the group consisting of a keyboard, a mouse, and a line connected to a remote site.

11. The fiber optic operations center of claim 1 wherein the output means is selected from the group consisting of an alphanumeric display, an audible alarm, a monitor, a printer, and a line connected to a remote site.

12. The fiber optic operations center of claim 1 wherein the output means is operable to provide a signal to activate a beeper.

13. The fiber optic operations center of claim 1 further comprising a local area network interconnecting the system controller to a multiplicity of modules, distributed throughout the fiber optic cable network, each module having a sensor adapted to monitor performance in a fiber optic cable and to provide a sensor alarm when signal threshold values are violated.

14. The fiber optic operations center of claim 1 wherein the system controller, in response to the sensor alarm, initiates a sampling of a fiber optic cable by the remote test unit.

15. The fiber optic operations center of claim 13 wherein the system controller serves as a control hub for optical sensors distributed throughout the fiber optic cable network for monitoring the integrity of traffic-bearing fibers or non-traffic-bearing fibers.

16. A fiber optic operations center comprising:
   a frame defining a series of mounting holes;
   an upper raceway, supported by the frame, having a radius adapted to protect fiber optic cables from excessive bending stress;
   a duct wall, supported by the frame, adapted to restrain fiber optic cables;
   a multiplicity of support shelves, having mounting brackets adapted to mate with mounting holes in the frame;

an optical switch, mounted to the frame, adapted to receive a multiplicity of fiber optic cables and to select one or more of them thereby connecting them to one or more outputs;

a remote test unit adapted to generate, transmit, receive, and analyze optical signals of at least one wavelength, having electronic inputs and outputs and optical inputs and outputs;

a system controller, supported by a shelf, having a multiplicity of inputs and outputs, being connected to the optical switch to direct the selection of fiber optic cables, being connected to the remote test unit to direct the generation of an optical signal;

a keyboard, mounted to a shelf, being connected to the system controller;

a monitor, mounted to a shelf, being connected to the system controller;

a fuse panel supported by the upper raceway;

a cable radius, interspersed between the optical switch and the remote test unit, being adapted to limit the minimum bend radius of a fiber optic cable;

a lower raceway, mounted to the frame, being adapted to restrain fiber optic cables;

an AC outlet assembly adapted to receive power and distribute it to the system controller, the remote test unit, and the optical switch;

a connector enclosure assembly adapted to receive input signals from a remote location and connect them to the system controller;

a facial rail, mounted to the frame, defining a series of holes; and a facial panel, having an inner surface supporting at least one latch, being pivotally connected to at least one side bracket, said bracket being adapted for fastening to at least one hole in the facial rail.

17. The fiber optic operations center of claim 16 further comprising a mouse connected to the system controller.

18. The fiber optic operations center of claim 16 further comprising a line connected from a remote site to the system controller.

19. The fiber optic operations center of claim 16 further including an output device coupled to said system controller, wherein the output device is selected from the group consisting of an alphanumeric display, an audible alarm, a printer, and a line connected to a remote site.

20. The fiber optic operations center of claim 19 wherein the output device is operable to provide a signal to activate a beeper.

* * * * *